US010604983B2

(12) United States Patent
Kobayashi et al.

(10) Patent No.: US 10,604,983 B2
(45) Date of Patent: Mar. 31, 2020

(54) OPENING/CLOSING BODY DRIVE DEVICE, VEHICLE DOOR, AND VEHICLE

(71) Applicant: MITSUBA Corporation, Gunma (JP)

(72) Inventors: Mayu Kobayashi, Nagano (JP); Tsuyoshi Kondo, Nagano (JP); Hideaki Kashiwagi, Nagano (JP); Masakane Yoshizawa, Nagano (JP); Sadaji Umehara, Nagano (JP); Yasuhiro Saito, Nagano (JP); Hideaki Takehara, Nagano (JP); Hiroyuki Ikeda, Nagano (JP)

(73) Assignee: Mitsuba Corporation, Gunma (JP)

( * ) Notice: Subject to any disclaimer, the term of this patent is extended or adjusted under 35 U.S.C. 154(b) by 63 days.

(21) Appl. No.: 15/775,433

(22) PCT Filed: Nov. 9, 2016

(86) PCT No.: PCT/JP2016/083269
§ 371 (c)(1),
(2) Date: May 11, 2018

(87) PCT Pub. No.: WO2017/082308
PCT Pub. Date: May 18, 2017

(65) Prior Publication Data
US 2018/0328095 A1 Nov. 15, 2018

(30) Foreign Application Priority Data

Nov. 13, 2015 (JP) .................................. 2015-223426

(51) Int. Cl.
*E05F 15/43* (2015.01)
*E05F 15/73* (2015.01)
(Continued)

(52) U.S. Cl.
CPC ............... *E05F 15/431* (2015.01); *B60J 1/00* (2013.01); *E05F 15/43* (2015.01); *E05F 15/689* (2015.01);
(Continued)

(58) Field of Classification Search
CPC ... E05F 15/431; E05F 15/43; E05F 2015/434; E05F 2015/767; E05F 15/689;
(Continued)

(56) References Cited

U.S. PATENT DOCUMENTS

| 5,955,854 A | 9/1999 | Zhang et al. |
| 6,984,818 B1 * | 1/2006 | Breed .................. G01S 17/026 250/221 |

(Continued)

FOREIGN PATENT DOCUMENTS

| EP | 2 901 553 A1 | 8/2015 |
| JP | H07-507116 A | 8/1995 |
| JP | 5768202 B1 | 8/2015 |

OTHER PUBLICATIONS

Extended Supplementary European Search Report dated May 29, 2019 in European Patent Application No. 16 86 4269.2.
(Continued)

*Primary Examiner* — Justin B Rephann
(74) *Attorney, Agent, or Firm* — Scully, Scott, Murphy & Presser, PC

(57) ABSTRACT

An opening/closing body drive device includes a drive mechanism that moves an opening/closing body between an opening position and a closing position relative to a frame portion having an opening, a control unit for controlling the drive mechanism, a light source unit including a light emitting element emitting a non-visible light and radiating the non-visible light to a detection line formed of a retroreflective material along at least a part of the frame portion, (Continued)

and a camera including an incident lens into which the non-visible light radiated from the light source unit and reflected by the detection line enters. At least of a part of the light source unit is arranged in front of the incident lens when the incident lens is viewed along an optical axis thereof from a side of the opening.

10 Claims, 11 Drawing Sheets

(51) Int. Cl.
  *E05F 15/689* (2015.01)
  *B60J 1/00* (2006.01)
  *E05F 15/695* (2015.01)
  *B60J 1/17* (2006.01)
(52) U.S. Cl.
  CPC ............ *E05F 15/695* (2015.01); *E05F 15/73* (2015.01); *B60J 1/17* (2013.01); *E05F 2015/435* (2015.01); *E05F 2015/765* (2015.01); *E05F 2015/767* (2015.01); *E05Y 2900/55* (2013.01)
(58) Field of Classification Search
  CPC .. E05F 15/73; E05F 15/695; B60J 1/17; B60J 1/00; E05Y 2900/55
  See application file for complete search history.

(56) References Cited

U.S. PATENT DOCUMENTS

| | | | |
|---|---|---|---|
| 9,606,255 B2 | 3/2017 | Sieg et al. | |
| 2005/0174079 A1* | 8/2005 | Mersch | B60J 7/0573 318/280 |
| 2005/0276449 A1* | 12/2005 | Pedemas | E05F 15/431 382/104 |
| 2008/0074067 A1* | 3/2008 | Rhodes | E05F 15/431 318/280 |
| 2014/0373446 A1* | 12/2014 | Weidenbacher | E05F 15/695 49/31 |
| 2015/0226870 A1 | 8/2015 | Sieg et al. | |
| 2018/0058127 A1 | 3/2018 | Ikeda et al. | |

OTHER PUBLICATIONS

English translation of International Preliminary Report on Patentability dated May 24, 2018 together with the Written Opinion received in related International Application No. PCT/JP2016/083269.

International Search Report dated Dec. 27, 2016 issued in PCT/JP2016/083264.

* cited by examiner

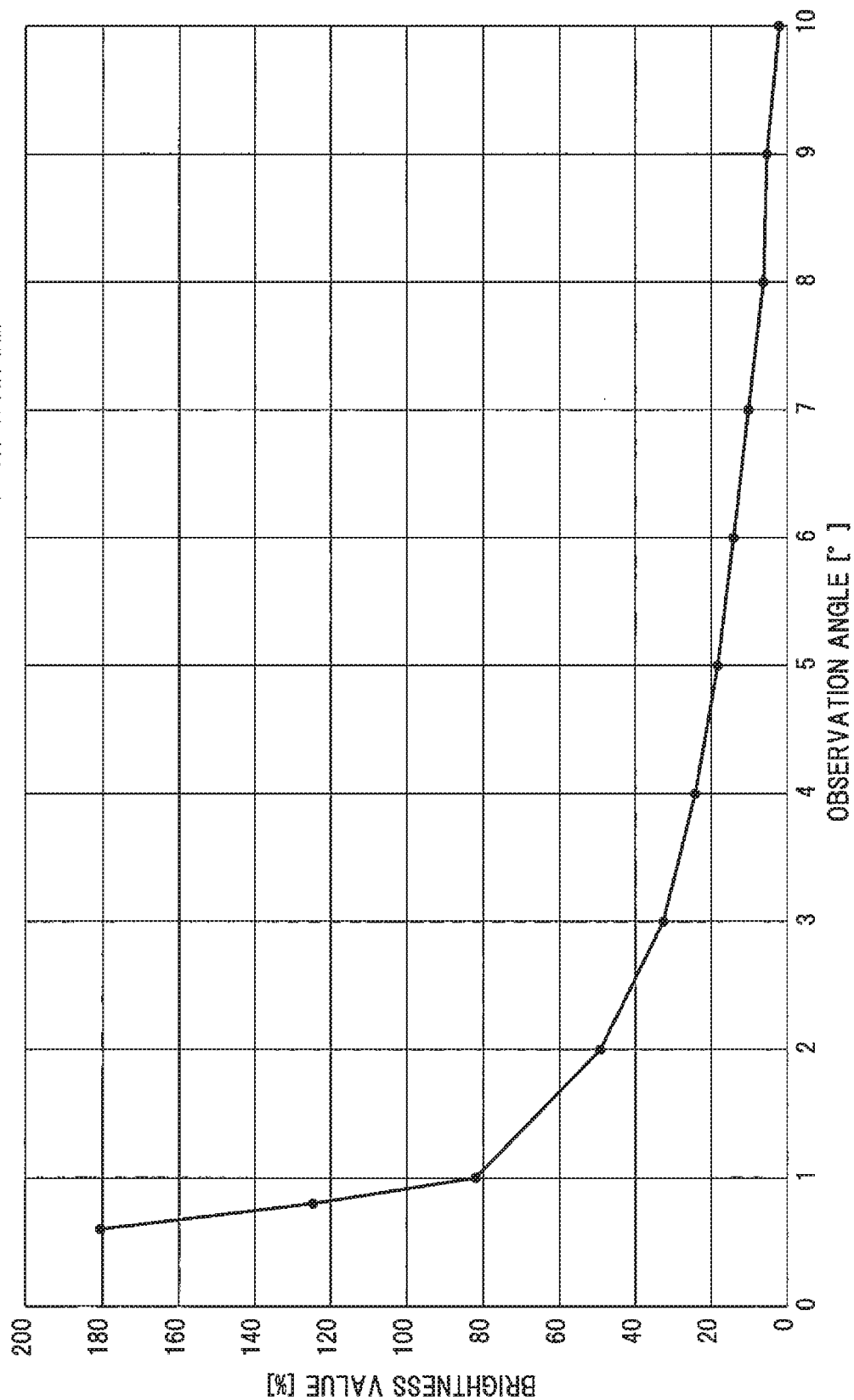

OPENING/CLOSING BODY DRIVE DEVICE, VEHICLE DOOR, AND VEHICLE

TECHNICAL FIELD

This invention relates to an OPENING/CLOSING BODY DRIVE DEVICE, a vehicle door and a vehicle.

BACKGROUND ART

An OPENING/CLOSING BODY DRIVE DEVICE is known which is provided with a drive mechanism that moves an opening/closing body between an opening position and a closing positon relative to a frame portion having an opening, and a control unit to control the drive mechanism.

For example, the OPENING/CLOSING BODY DRIVE DEVICE includes an automatic door device for automatically opening/closing a slide type door and a window glass raising/lowering device for a vehicle for automatically raising/lowering the window glass of a vehicle door.

To electrically open/close the opening/closing body such as the slide type door or the window glass, a mechanism to prevent pinching by the opening/closing body is generally provided on the OPENING/CLOSING BODY DRIVE DEVICE.

As such OPENING/CLOSING BODY DRIVE DEVICE, the applicant of the present invention proposes a vehicle glass raising/lowering device that is provided with a camera for imaging a detection line provided along a window frame, and performs a pinching prevention operation for the drive mechanism to prevent pinching by the window glass when the detection line captured in an image by the camera is partially blocked by the foreign object (see e.g., PTL1).

The vehicle glass raising/lowering device described in PTL 1 is provided with a light source unit having a plurality of light emitting elements that emits infrared radiation toward the detection line, and can detect the foreign object that may be pinched during the night etc., by capturing an image of infrared radiation emitted from the plurality of light emitting elements and reflected by the detection line by the camera arranged in the vicinity of the light source unit.

Further, the vehicle glass raising/lowering device described in PTL 1 partially protrudes a lens into which the reflected light reflected by the detection line enters from a door trim for capturing an image of the entire detection line formed along the window frame by the camera.

CITATION LIST

Patent Literature

PTL 1: JP 5768202 (B1)

SUMMARY OF INVENTION

Technical Problem

In the OPENING/CLOSING BODY DRIVE DEVICE described in PTL 1, the inventors of the present invention have studied that the detection line is composed of a retroreflective material so as to effectively enter the infrared radiation that is radiated from the plurality of light emitting elements and reflected by the detection line into the lens of the camera. Since incident angle and output angle of the retroreflective material are substantially same, by decreasing the distance between the plurality of light emitting elements and an optical axis of the lens, it is possible to efficiently enter the infrared radiation reflected by the detection line into the lens.

However, even if the distance between the plurality of light emitting elements and the optical axis of the lens is intended to simply reduce, the distance fails to be reduced in shorter than the radius of the lens. That is, there is a limit to close the positions of the plurality of light emitting elements and the optical axis of the lens each other, and the distance between the plurality of light emitting elements and the optical axis of the lens fails to be reduced sufficiently. Thus, the retroreflective material fails to perform the property sufficiently.

When the aperture of the lens is reduced, the positions of the light emitting elements and the optical axis of the lens can be closed. However, in such case, since a light receiving area for receiving the incident light at the lens becomes small, light intensity of the infrared radiation reaching an imaging device (a CMOS image sensor) of the camera decreases. Therefore, it is necessary to increase the number of the light emitting elements arranged or to use a high-output light emitting element in order to secure a desired light intensity. This prevented a reduction in the manufacturing cost.

It is an object of the present invention to provide an OPENING/CLOSING BODY DRIVE DEVICE that can reduce the manufacturing cost by reducing the number of light emitting elements or using a low-output light emitting element, as well as a vehicle door and a vehicle using the OPENING/CLOSING BODY DRIVE DEVICE.

Solution to Problem

An OPENING/CLOSING BODY DRIVE DEVICE according to an embodiment of the present invention comprises:
  a drive mechanism that moves an opening/closing body between an opening position and a closing position relative to a frame portion having an opening;
  a control unit for controlling the drive mechanism;
  a light source unit comprising a light emitting element emitting a non-visible light and radiating the non-visible light to a detection line formed of a retroreflective material along at least a part of the frame portion; and
  a camera comprising an incident lens into which the non-visible light radiated from the light source unit and reflected by the detection line enters,
  wherein the control unit comprises a detection means for detecting a blocked state in which at least a part of the detection line imaged by the camera is blocked by a foreign object, and a pinching prevention means that forces the drive mechanism to perform a pinch prevention operation for preventing pinching by the opening/closing body when the blocked state is detected by the detection means while the opening/closing body is moved by the drive mechanism,
  wherein at least of a part of the light source unit is arranged in front of the incident lens when the incident lens is viewed along an optical axis thereof from a side of the opening.

A vehicle door according to another embodiment of the present invention comprises the OPENING/CLOSING BODY DRIVE DEVICE,
  wherein the opening/closing body is a window glass installed in a door of a vehicle, wherein the frame portion is a window frame contacting an outer edge of the window glass in a fully closed state, and wherein the drive mechanism is arranged in the door of the vehicle and moves the window glass in a vertical direction.

A vehicle according to another embodiment of the present embodiment comprises the vehicle door.

Advantageous Effects of Invention

According to one embodiment of the present invention, the OPENING/CLOSING BODY DRIVE DEVICE can be provided that can reduce the manufacturing cost by reducing the number of light emitting elements or using a low-output light emitting element, as well as a vehicle door and a vehicle using the OPENING/CLOSING BODY DRIVE DEVICE.

BRIEF DESCRIPTION OF DRAWINGS

FIG. 9 is a graph chart showing the relationship between an observation angle and a brightness of reflected light.

DESCRIPTION OF EMBODIMENT

Embodiments

An embodiment of the invention will be described later in reference to figures.

Figure 1:
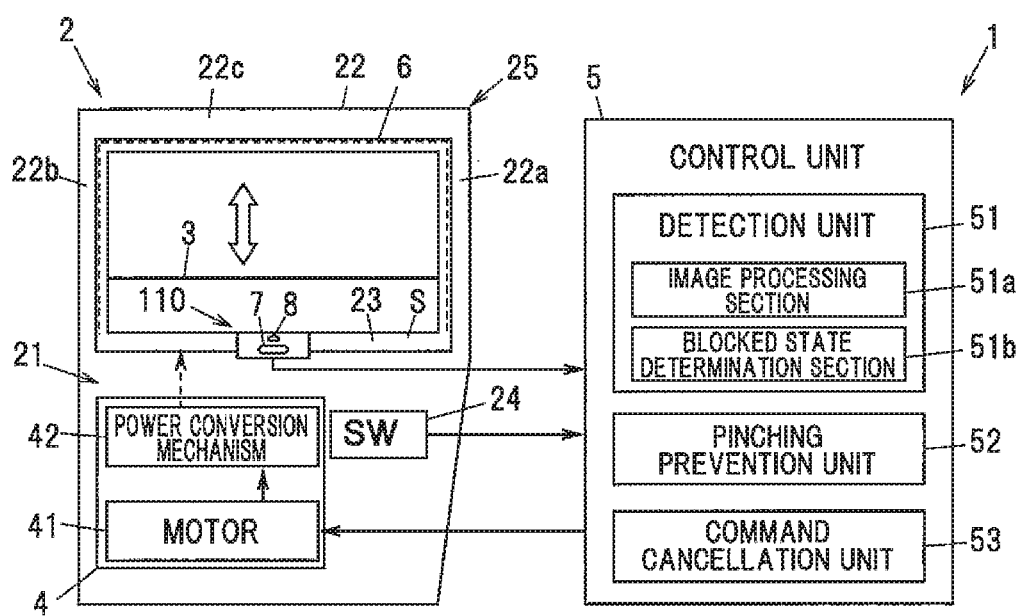
FIG. 1 is an explanatory diagram illustrating a schematic configuration of OPENING/CLOSING BODY DRIVE DEVICE in the present embodiment.

FIG. 1 is an explanatory diagram illustrating a schematic configuration of OPENING/CLOSING BODY DRIVE DEVICE in the present embodiment.

As shown in FIG. 1, it will be described that the OPENING/CLOSING BODY DRIVE DEVICE 1 is a vehicle window glass raising/lowering device as an example in the present embodiment. However, it is not limited thereto. The opening/closing body device 1 may be a device such as an automatic door that opens and closes a slide type door automatically.

A door 2 of a vehicle (vehicle door) mounting the vehicle window glass raising/lowering device as the OPENING/CLOSING BODY DRIVE DEVICE 1 is provided with a storage portion 21 for housing a window glass 3 as an opening/closing body and a window glass frame portion 22 provided above the storage portion 21. A door trim 23 is attached on the vehicle interior side of the storage portion 21 so as to cover the storage portion 21.

The window glass frame portion 22 is composed of a rear upright portion 22a extending upwards from an end of the storage portion 21 on the rear side in the front-back direction of the vehicle, a front upright portion 22b extending upwards from the storage portion 21 on the front side with respect to the rear upright portion 22a, and an upper extended portion 22c extending from the top end of the rear upright portion 22a to the top end of the front upright portion 22b. When the window glass 3 is fully closed, the window glass 3 is positioned in a space surrounded by the window glass frame portion 22 and the upper edge portion of the door trim 23. That is, a window frame 25 is composed of the window glass frame portion 22 and the upper edge portion of the door trim 23. In the present embodiment, the window frame 25 means a portion that contacts outer edges of the window glass 3 when fully closing the door 2 and the window glass 3 in a fully closed state. The window frame 25 is one embodiment of the frame portion in the present invention.

The OPENING/CLOSING BODY DRIVE DEVICE 1 is provided with a drive mechanism 4 for moving the opening/closing body (the window glass 3) between an opening position and a closing position relative to the frame portion (the window frame 25) having an opening 25a, and a control unit 5 for controlling the drive mechanism 4.

The drive mechanism 4 is to move the window glass 3 vertically relative to the window frame 25, and is provided with a motor 41 such as DC motor, and a power conversion mechanism 42 for converting a drive force of the motor 41 into power to vertically move the window glass 3. The power conversion mechanism 42 which can be used here is, e.g., a window regulator which is provided with a carrier plate supporting the window glass 3 and slidably moving along a guide rail and is configured to slidably move a wire along the guide rail by a drive force of the motor 41 and thereby to vertically move the carrier plate attached to the wire and the window glass 3 along the guide rail. An X-Arm type or another type of regulator can be also used as the power conversion mechanism 42.

A switch (SW) 24 is provided on the door 2 to raising/lowering the window glass 3. An output signal line of the switch 24 is connected to the control unit 5. The switch 24 is constructed from, e.g., a two-stage click-type rocker switch which is configured to output a signal to the control unit 5, such that a first-level move-down click signal is output when an end on the move-down side is clicked to the first level, a second-level move-down click signal is output when the end on the move-down side is clicked to the second level, a first-level move-up click signal is output when the other end on the move-up side is clicked to the first level, and a second-level move-up click signal is output when the other end on the move-up side is clicked to the second level.

The control unit 5 controls the drive mechanism 4 according to the signal from the switch 24 to vertically move the window glass 3. The control unit 5, as a control unit constructed by appropriately combining CPU, memory, interface and software, etc., is mounted on the door 2. Other than on the door 2, the control unit 5 may alternatively be mounted as a part of, e.g., an electronic control unit (ECU) which controls mirrors or seats of the vehicle.

The control unit 5 is configured to control the drive mechanism 4 such that when a first-level move-down click signal is input from the switch 24, the window glass 3 is lowered during when the signal is being input, and when a second-level move-down click signal is input, the window glass 3 continues to move down until the window glass 3 reaches the bottom or the switch 24 is operated again. Also, the control unit 5 controls the drive mechanism 4 such that when a first-level move-up click signal is input from the switch 24, the window glass 3 is raised during when the signal is being input, and when a second-level move-up click signal is input, the window glass 3 continues to move up until the window glass 3 reaches the top or the switch 24 is operated again.

Next, a configuration to prevent pinching by the opening/closing body (the window glass 3) will be described.

The OPENING/CLOSING BODY DRIVE DEVICE 1 is provided with a light source unit 8 which radiates non-visible light to a detection line 6 formed of a retroreflective material along at least a part of the frame portion (the window frame 25) and a camera 7 provided with a plurality of incident lenses 71a on which the non-visible light radiated from the light source unit 8 and reflected by the detection line 6 enters. In the present embodiment, the OPENING/CLOSING BODY DRIVE DEVICE 1 determines whether or not a foreign object that may be pinched by the window glass 3 exists based on an image captured by the camera 7.

In the present embodiment, a light source unit that irradiates near infrared radiation is used as the light source unit 8. The camera 7 is constructed from an infrared camera which captures the infrared radiation emitted from the light source unit 8 and reflected by the detection line 6. Since the light source unit 8 is provided, a foreign object to be possibly pinched can be detected also during the night, or in a dark place even in a daytime where infrared radiation does not reach, e.g., in an underground parking, etc. Specific configurations and attachment positions of the camera 7 and the light source unit 8 will be described later.

The detection line 6 is a reference for judging presence/absence of a foreign object to be possibly pinched by the window glass 3, and is provided on the vehicle interior side with respect to the window glass 3 along at least a part of the outer edge of the window glass 3 in closing the door 2 and the window glass 3. A specific configuration and setting position of the detection line 6 will be described later.

The control unit 5 is provided with a detection unit 51 and a pinching prevention unit 52. The detection unit 51, which is one aspect of the detection means of the invention, detects a blocked state in which the detection line 6 captured by the camera 7 is at least partially blocked by a foreign object. The pinching prevention unit 52, which is one aspect of the pinching prevention means of the invention, causes the drive mechanism 4 to perform a pinch prevention operation for preventing pinching by the opening/closing body (the window glass 3) when the blocked state is detected by the detection unit 51 during when the opening/closing body (the window glass 3) is moved by the drive mechanism 4.

The detection unit 51 is provided with an image processing section 51a which processes an image captured by the camera 7 and extracts the detection line 6, and a blocked state determination section 51b which determines, based on the image processed by the image processing section 51a, whether or not it is the blocked state in which the detection line 6 is at least partially blocked by a foreign object.

A specific method of extracting the detection line 6 by the image processing section 51a is not specifically limited. For example, when an unnecessary portion is removed by trimming the image captured by the camera 7 and posterization process, binarization process, or edge detection process is performed, the detection line 6 with brightness different from surrounding members can be extracted.

The blocked state determination section 51b is configured such that, for example, an image in a non-blocked state (which is an image after being processed by the image processing section 51a) is preliminarily stored as an initial state image, and whether or not the detection line 6 is blocked by an foreign object is determined by comparing the initial state image to an image output from the image processing section 51a. The blocked state determination section 51b is configured to, e.g., compare the initial state image to an image output from the image processing section 51a and to determine it is the blocked state when a difference of the edge of the extracted detection line 6 or a difference of the area of the detection line 6 exceeds a preset foreign object determination threshold.

The pinching prevention unit 52 causes the drive mechanism 4 to perform a pinch prevention operation for preventing pinching by the window glass 3 when the blocked state is detected by the detection unit 51 during when the window glass 3 is moved by the drive mechanism 4. The pinch prevention operation includes an operation of stopping movement of the window glass 3, an operation of lowing the window glass 3 to a safe position, an operation of warning an operator by sound or light from an alarm device installed inside the vehicle, and a combination thereof.

The control unit 5 is further provided with a command cancellation unit 53 which cancels a command from the switch 24 when the blocked state is detected by the detection unit 51 after a command to move the window glass 3 is issued from the switch 24 but before the window glass 3 starts to move. Since the command cancellation unit 53 is provided, the window glass 3 does not move during when the blocked state is detected, and safety is thus further improved.

Next, specific configurations, etc., of the camera 7 and the light source unit 8 will be described.

Figure 2:
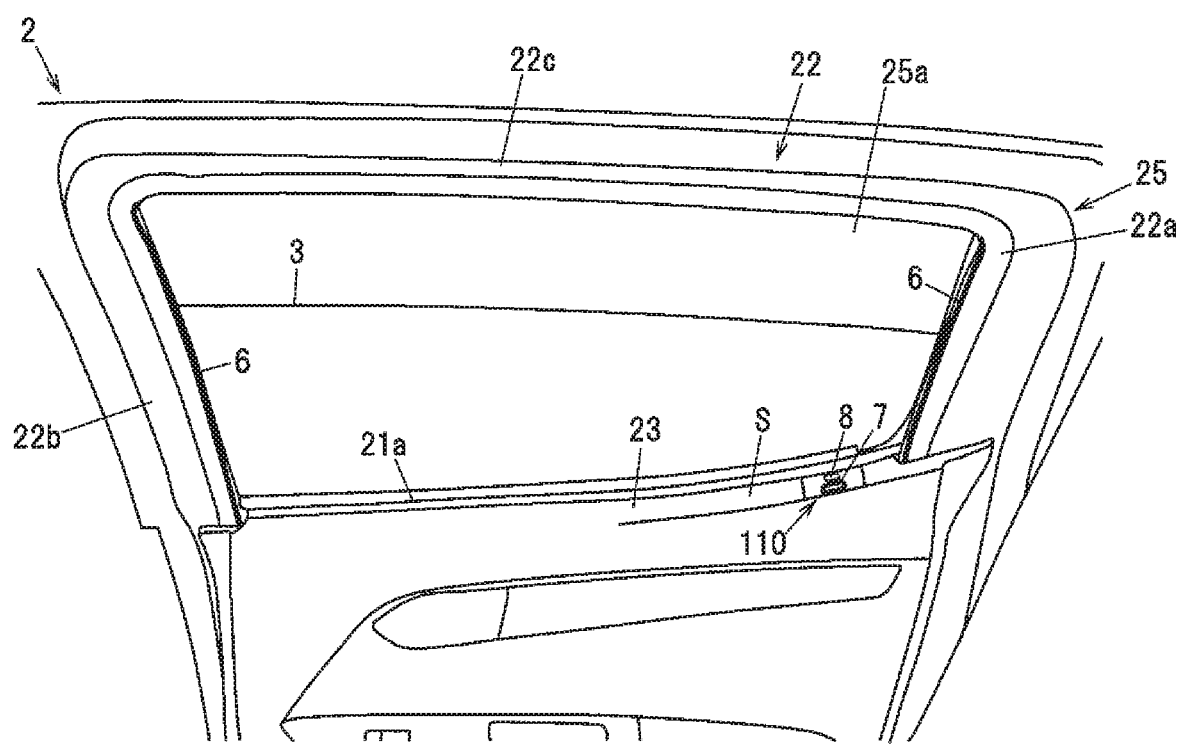
FIG. 2 is an explanatory diagram illustrating a door when viewed from the upper side inside a vehicle.
Figure 3:
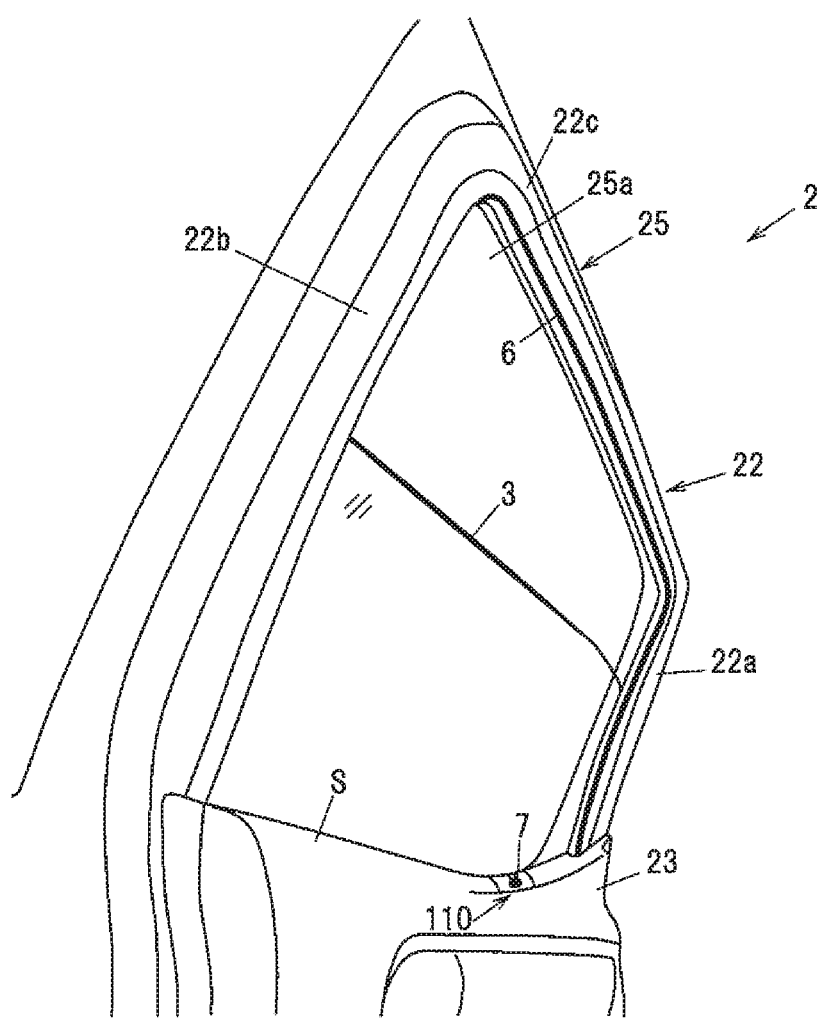
FIG. 3 is an explanatory diagram illustrating the door when viewed from the lower-front side of the vehicle.
Figure 4A:
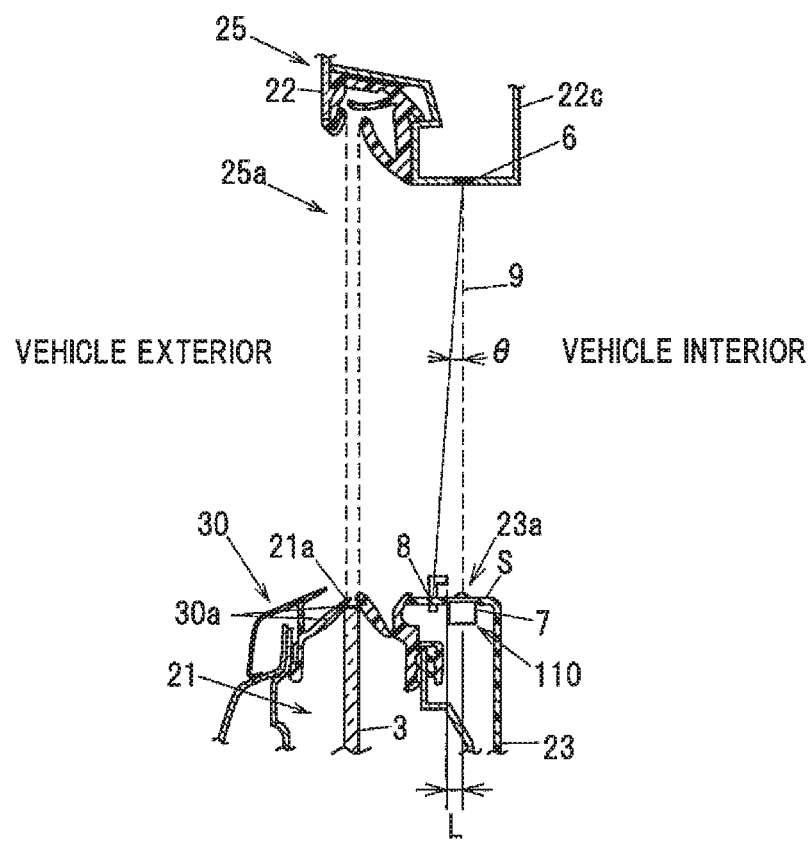
FIG. 4A is a cross sectional view illustrating a part of the door along a position where a camera is included.
Figure 4B:
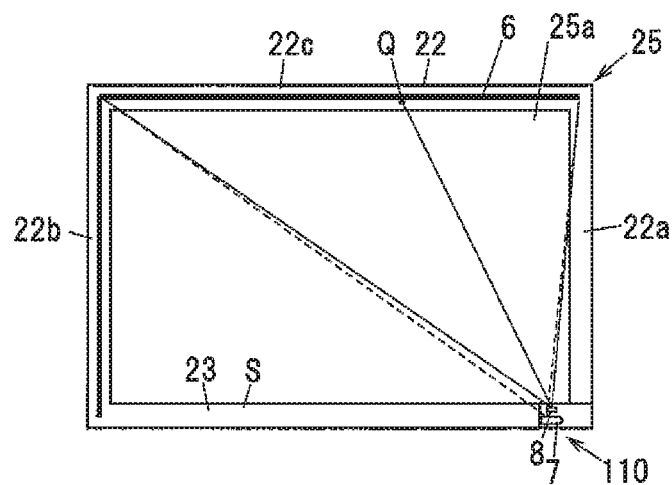
FIG. 4B is an explanatory diagram illustrating an arrangement position of a camera unit shown in FIG. 4A.

FIG. 2 is an explanatory diagram illustrating the door 2 when viewed from the upper side inside a vehicle. FIG. 3 is an explanatory diagram illustrating the door 2 when viewed from the lower-front side of the vehicle. FIG. 4A is a cross sectional view illustrating a part of the door along the position including the camera 7. FIG. 4B is an explanatory diagram illustrating an arrangement position of the camera unit 110 shown in FIG. 4A.

As shown in FIGS. 2 to 4B, in the OPENING/CLOSING BODY DRIVE DEVICE 1 according to the present embodiment, the camera 7 is provided on an upper surface S of the door trim 23. The upper surface S of the door trim 23 here is an outer surface of the door trim 23 at a top edge portion and is a surface which is visible from above in a vertical direction. The upper surface S of the door trim 23 may be inclined with respect to the vehicle width direction (horizontal direction). The door trim 23 is generally curved such that the upper surface S has the highest portion in the vicinity of the window glass 3, i.e., in the vicinity of an exit slot 21a allowing the window glass 3 to come out from the storage portion 21, and slopes down as a distance from the window glass 3 increases. Thus, the upper surface S of the door trim 23 is an outer surface of the door trim 23 (a portion corresponding to a lower side inner peripheral edge surface of the window frame 25) in the vicinity of the window glass 3 (the exit slot 21a).

In the present embodiment, the pinch prevention operation is also performed when the blocked state is detected during when the window glass 3 is moving down. This is to prevent a part of human body such as finger from being dragged into the exit slot 21a during when the window glass 3 is moving down. A weather strip 30 having a lip seal 30a slidably in contact with the window glass 3 is provided around the exit slot 21a to prevent ingress of water, etc., into the storage portion 21 (an internal space of the door 2). When the window glass 3 is lowered, clothing or a part of human body such as finger may be dragged, together with the lip seal 30a, into the storage portion 21. In the present embodiment, it is possible to prevent such dragging and thereby to further improve safety. Here, an operation of moving down the window glass 3 is not included in the pinch prevention operation which is performed when the blocked state is detected during when the window glass 3 is moving down.

A detection surface 9 described hereinafter is a plane formed by connecting points between the camera 7 and the detection line 6 at which the foreign object when located thereon causes the blocked state. The detection surface 9 is substantially the same as a plane connecting the center of the camera 7 (the center in the vehicle width direction, the height direction, and the front-back direction of the vehicle) to the detection line 6, although depending on a specific configuration of the camera 7. The detection surface 9 does not need to be an entirely continuous plane. For example, when the detection line 6 is not continuous, the detection surface 9 is composed of plural planes. Meanwhile, in case that the detection line 6 is composed of dots, lines are formed when connecting points between an optical system 71 of the camera 7 and the detection line 6 at which a foreign object when located thereon causes the blocked state, and such lines are also included as the detection surface 9. When the detection surface 9 is composed of plural planes or lines, a distance between adjacent planes or lines is desirably not more than at least a thickness of young child's finger (e.g., 4 mm) to ensure safety.

Next, the positional relationship between the camera 7 and the light source unit 8, and the detection line 6 etc., will be described.

As shown in FIG. 4A, the trim opening 23a is formed on the vehicle interior side with respect to the exit slot 21a, and the camera 7 is arranged on the vehicle interior side with respect to the exit slot 21a. Further, as shown in FIG. 4B, when the detection line 6 is formed only on the front upright portion 22b and the upper extended portion 22c, almost the entire window frame 25 can be in range of detection along the entire detection line 6 by arranging the camera unit 110 in the vicinity of the rear upright portion 22a on the upper surface S of the door trim 23.

When an angle (an observation angle) between the light source unit 8 and the optical axis of the camera 7 with respect to the detection line is expressed as θ, as shown in FIG. 9, as the observation angle θ increases, the brightness generally decreases. In addition, as the distance between the light source unit 8 and the camera unit 110 decreases, the value θ of the observation angle decreases over the entire detection line 6. In the present embodiment, when expressing distance between the camera unit 110 and the light source unit 8 as L, the observation angle is configured to be 1.5° when the distance L is, e.g., 7.85 mm. Specification about the distance L will be described later.

Figure 5:
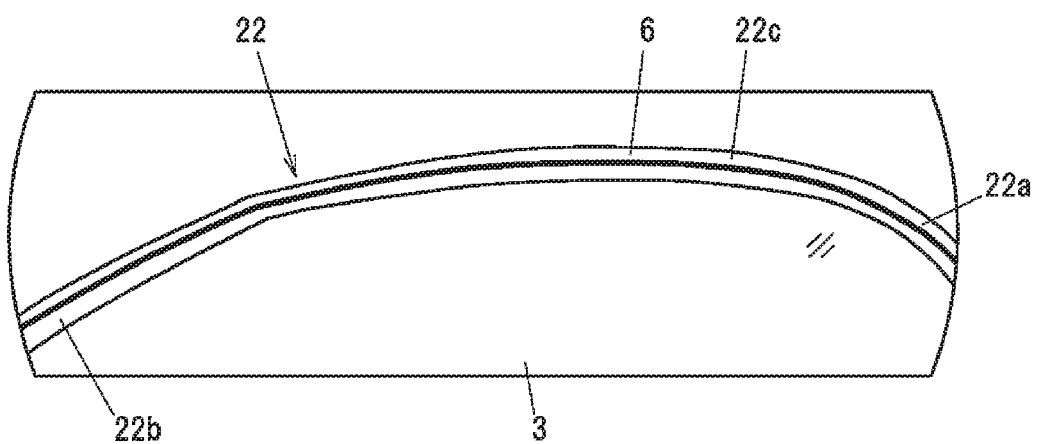
FIG. 5 is an explanatory diagram illustrating an image captured by the camera according to the present embodiment.

Also, as not shown, when the detection line 6 is formed only on the rear upright portion 22a and the upper extended portion 22c, almost the entire window frame 25 can be in the range of detection along the entire detection line 6 by arranging the camera unit 110 in the vicinity of the front upright portion 22b on the upper surface S of the door trim 23. One example of the image captured by the camera 7 will be shown in FIG. 5.

Next, a specific configuration etc., of the detection line 6 will be described.

The detection line 6 is formed along at least a part of the outer edge of the window glass 3 in closing the door 2 and the window glass 3. The detection line 6 is provided on the vehicle interior side with respect to the window glass 3. In the present embodiment, the detection line 6 is provided along the entire frame portion 22 on the vehicle interior side at a distance from the window glass 3.

The detection line 6 may be provided on either the door 2 side or the vehicle body side as long as it is provided along the window frame 25. Further, the detection line 6 may not be continuous, and can be provided partially on the door 2 and partially on the vehicle body.

In the present embodiment, the detection line 6 provided on the door 2 side will be described as an example. In this case, the detection line 6 is provided on the inner circumferential surface of the entire window glass frame portion 22, i.e., the inner circumferential surfaces of all the rear upright portion 22a, the front upright portion 22b, and the upper extended portion 22c, on the vehicle interior side at a distance from the window glass 3. The inner circumferential surface of the window glass frame portion 22 here is a surface of the window glass frame portion 22 facing the window glass 3 and is composed of a surface of the rear upright portion 22a on the front side of the vehicle, a surface of the front upright portion 22b on the rear side of the vehicle, and a surface of the upper extended portion 22c on the lower side. In other words, the inner circumferential surface of the frame portion 22 is an outer surface of the frame portion 22 in the vicinity of the window glass 3.

Figure 6A:
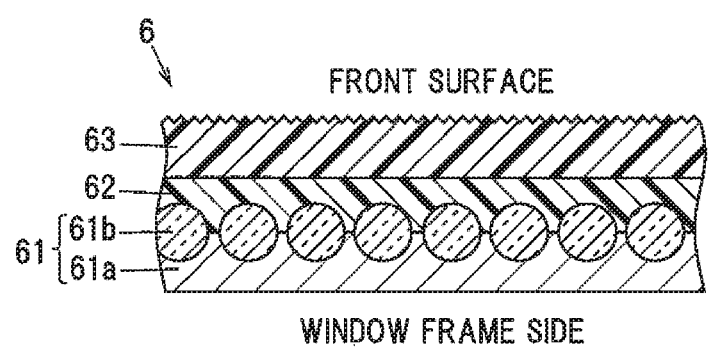
FIG. 6A is a cross sectional view illustrating a configuration of a detection line.
Figure 6B:
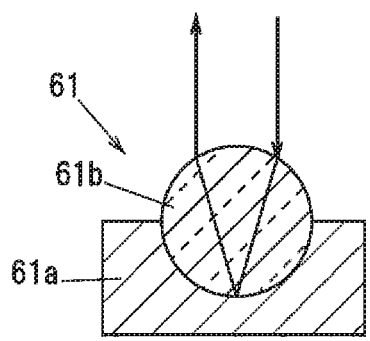
FIG. 6B is an explanatory diagram illustrating a microbead type retroreflective material.

As shown in FIGS. 6A, 6B, in the present embodiment, the detection line 6 is provided with a reflection layer 61 formed of a microbead type retroreflective material, a visible light cutting layer 62 cutting the visible light, which is formed on a non-visible light entering side of the reflection layer 61, and a weatherproof layer 63 formed on the non-visible light entering side of the visible light cutting layer 62.

The retroreflective material reflects incident light to the direction for the light source unit. A microbead type retroreflective material using tiny glass beads (microbeads) and a prism type retroreflective material using a tiny prism on a triangular pyramid are known. Among them, since the prism type retroreflective material is expensive, in the present embodiment, the microbead type retroreflective material is used for the detection line 6.

For example, the reflection material layer 61a comprises metals such as aluminum. The reflection layer is formed by aluminum evaporating to a number of glass beads 61b, and the visible light cutting layer 62.

As shown in FIG. 6B, the light entered into the glass beads 6 inflects at the surface of the glass beads 61b, reflects at the reflection material layer 61a, inflects again at the surface of the glass beads 61 b, and the reflected light outputs in an inputting direction. Thus, angles of incident and reflection of the light are substantially equal. In other words, in the present embodiment, the non-visible light (near infrared radiation) entered into the detection line 6 from the light source unit 8 is reflected toward the light source unit 8 side.

The visible light cutting layer 62 is to prevent the visible light from reflecting by the reflection layer 61 by cutting the visible light such that driver does not feel too bright. For example, as the visible light cutting layer 62, an acrylic resin can be used.

For example, the weatherproof layer 63 is composed of polyethylene terephthalate (PET) or acrylic resin and is to protect the visible light cutting layer 62 and the reflection layer 61. In the present embodiment, the surface of the weatherproof layer 63 has matte to prevent the visible light from reflecting on the surface of the weatherproof layer 63. For example, matte processing on the surface of the weatherproof layer 63 can be carried out by sand blasting.

Figure 7A:
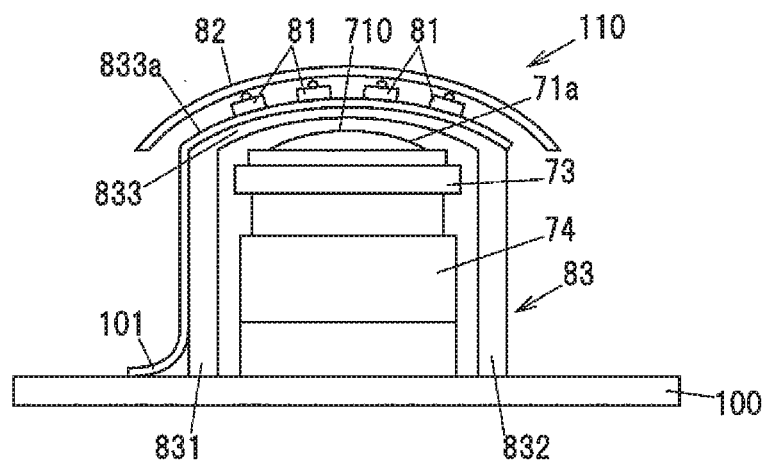
FIG. 7A is a front view illustrating a configuration example of the camera.
Figure 7B:
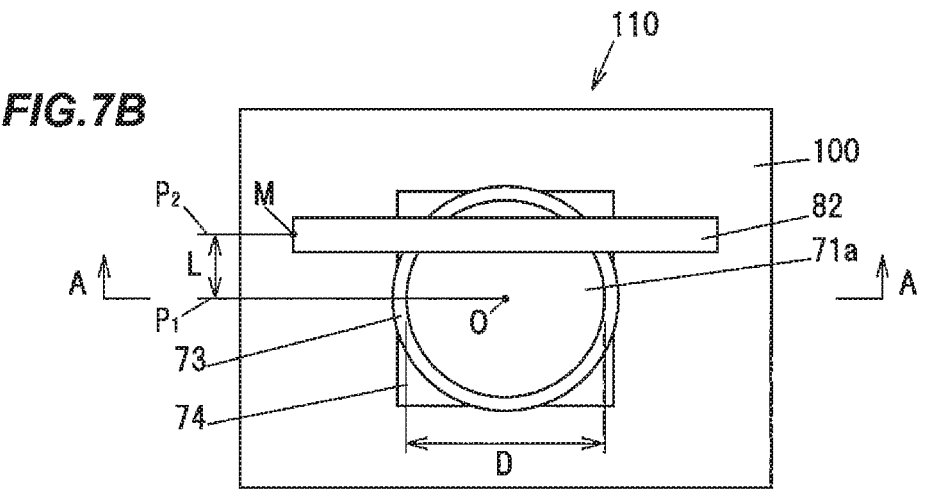
FIG. 7B is a top view illustrating a configuration example of the camera.
Figure 7C:
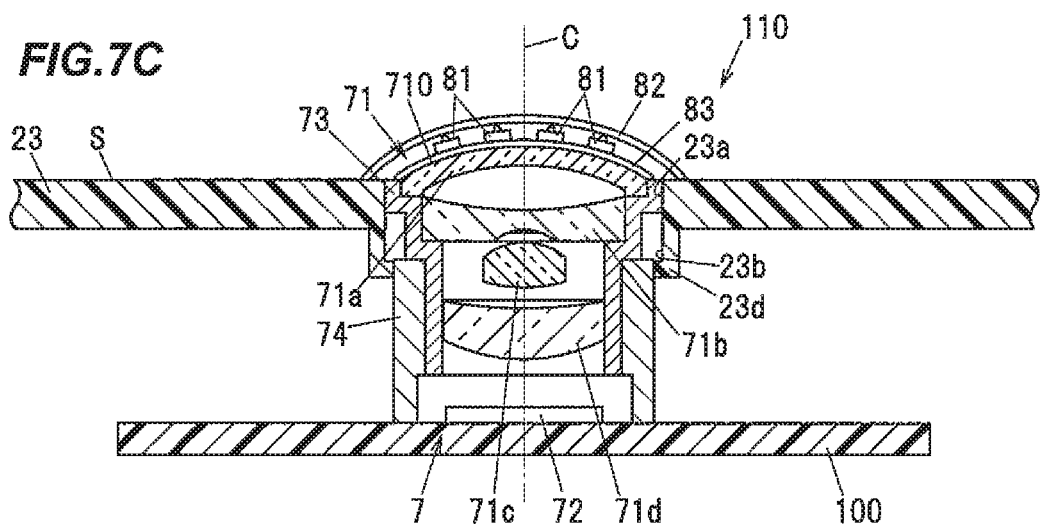
FIG. 7C is a cross sectional view cut along the line A-A in FIG. 7B.
Figure 8A:
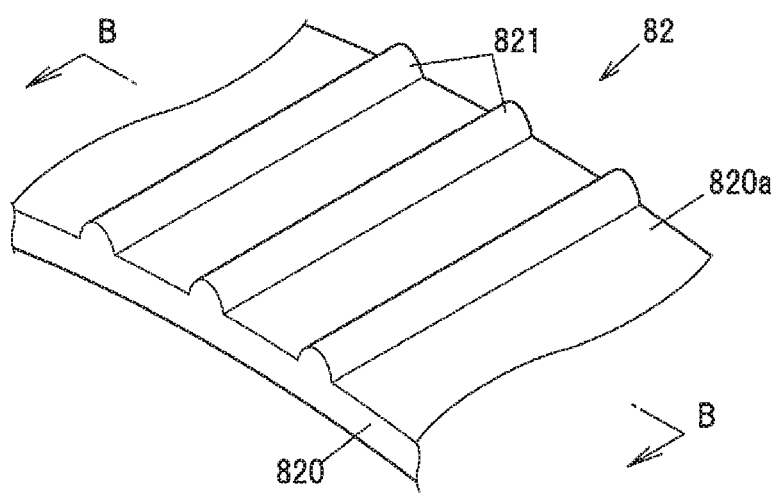
FIG. 8A is a perspective view illustrating a part of a diffusing plate.
Figure 8B:
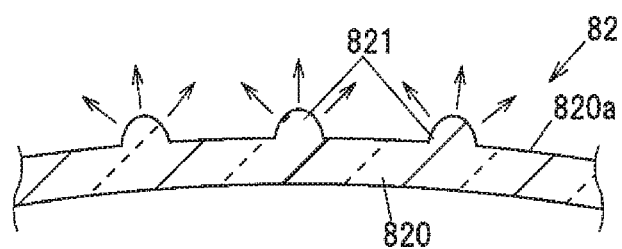
FIG. 8B is a cross sectional view cut along the line B-B in FIG. 8A.

The configuration of the camera 7 according to the present embodiment will be described with reference to FIGS. 7A to 8B. FIG. 7A is a front view illustrating a configuration example of the camera 7 with viewed along the vehicle width direction. FIG. 7B is a top view illustrating the camera 7. FIG. 7C is a cross sectional view of FIG. 7B cut along the line A-A. FIG. 8A is a perspective view illustrating a part of a diffusing plate 82. FIG. 8B is a cross sectional view of FIG. 8A cut along the line B-B.

As shown in FIGS. 7A to 7C, the camera 7 is provided with the optical system 71 into which the non-visible light (near infrared radiation) emitted from the light source unit 8 and reflected by the detection line 6 enters, an image pickup device 72 onto which a subject image is focused by the optical system 71, a lens barrel 73 holding the incident lens 71a and condenser lenses 71b to 71d, and a mount 74 to hold the optical system 71 and the lens barrel 73 on the circuit board 100. Further, the optical system 71 is arranged at a position corresponding to a trim opening 23a formed on the upper surface S of the door trim 23 (shown in FIGS. 4A, 4B) so that an optical axis C of the optical system 71 passes through the trim opening 23a.

As shown in FIG. 7C, the optical system 71 is configured to include a single incident lens 71a that directly enters light, and a plurality of condenser lenses 71b to 71d that condenses light transmitted through the incident lens 71a onto the image pickup device 72. The incident lens 71a is arranged at a position closest to the detection line 6 in the direction along the optical axis C among the plurality of lenses configuring the optical system 71. An incident surface 710 of the optical system 71 is exposed from the upper surface S of the door trim 23.

The trim opening 23a is formed on the vehicle interior side with respect to the exit slot 21a, and the optical system 71 of the camera 7 is arranged so that the optical axis C is located on the vehicle interior side with respect to the exit slot 21a. Although the camera 7 in this example is arranged so that the optical axis C of the optical system 71 coincides with the vertical direction when viewed in the cross section in FIG. 4A, the optical axis C of the optical system 71 may be inclined with respect to the vertical direction in the front-back direction of the vehicle or in the vehicle width direction, and can be appropriately adjusted according to the installed position or desired imaging range of the camera 7.

In the present embodiment, the camera 7 is arranged in a hole 23b provided on the upper surface S of the door trim 23 at the front side position of the vehicle (at the front side position of the upper surface S of the door trim 23 on a side facing the window glass 3). Although the case that the camera 7 is arranged on the upper surface S of the door trim 23 is described as one example, the position of providing the camera 7 is not limited thereto.

The camera 7 is inserted into the hole 23b from above the door trim 23 and is fixed to the door trim 23 by engaging a locking pawl 23d provided at a lower circumferential edge of the hole 23b with a groove (not shown) provided on the camera 7. Although the top end face of the lens barrel 73 of the camera 7 coincides with the upper surface S of the door trim 23 in this example, the top end face of the lens barrel 73 of the camera 7 may protrude upward from the upper surface S of the door trim 23 or may be located below the upper surface S of the door trim 23. In addition, although the camera 7 in this example is arranged so that a part of the incident lens 71a is located above the trim opening 23a, the camera 7 may be arranged so that the optical system 71 is located below the trim opening 23a. In addition, the configuration for fixing the camera 7 to the door trim 23 and the direction to insert the camera 7 are not specifically limited and can be appropriately changed.

The camera 7 is desirably configured so that the imaging range (a viewing angle) thereof covers the entire moving area of the window glass 3. In detail, in case that the window glass 3 is configured to be completely retracted, the viewing angle of the camera 7 desirably covers the range from the upper end of the rear upright portion 22a to the lower end of the rear upright portion 22a on the rear side of the vehicle, and from the upper end of the front upright portion 22b to the lower end of the front upright portion 22b on the front end of the vehicle. Meanwhile, in case that the window glass 3 is configured to not be completely retracted, the viewing angle of the camera 7 desirably covers the range from the upper end of the rear upright portion 22a to an intersection formed between the rear upright portion 22a and the upper edge (upper rim) of the window glass 3 which is located at the lowest position, and the range on the front side of the vehicle from the upper end of the front upright portion 22b to an intersection formed between the front upright portion 22b and the upper edge (upper rim) of the window glass 3 which is located at the lowest position.

It is desirable to use a wide-angle lens as the optical system 71 of the camera 7 so that a foreign object can be detected in the range described above. The optical system 71 used in this example is formed by combining the incident lens 71a and the condenser lenses 71b to 71d so as to have a viewing range of not less than 180°, or 190° taking into account the installation precision, in the front-back direction of the vehicle. Meanwhile, the numbers of the incident lens 71a and the conductor lenses 71b to 71d are not limited thereto and specific configurations of respective incident lens 71a and the conductor lenses 71b to 71d are not limited to thereof shown in drawings.

To quickly detect the foreign object, the frame rate of the image pickup device 72 used is desirably as high as possible. In the present embodiment, a CMOS (Complementary MOS) image sensor is used as the image pickup device 72. The image pickup device 72 is mounted on the circuit board 100.

In the present embodiment, the light source unit 8 is provided with a plurality of (four in the present embodiment) light emitting elements 81 emitting non-visible light (near infrared radiation), a diffusing plate 82 as a light diffusing member to diffuse and emit the non-visible light (near infrared radiation) emitted from the light emitting element 81 in a direction along the detection line 6, and a supporting member 83 which supports the light emitting element 81 to the circuit board 100.

In the present embodiment, the camera unit 110 is integrally constituted by the light source unit 8 and the camera 7. By configuring the camera unit 110, it is easy to attach the camera 7 and the light source unit 8.

As shown in FIG. 7A, the four light emitting elements 81 are arranged along the longitudinal direction (front-rear direction of the vehicle) of the detection line 6 when viewed from the camera 7, and are mounted on a mounting surface of flexible substrate 101 arranged between the light emitting elements 81 and a connecting portion 833 of the supporting member 83 described later. Although the light source unit 8 is configured to irradiate non-visible light (near infrared radiation) to the detection line set at an entire inner peripheral surface of the window glass frame portion 22 by using the four light emitting elements 81, the number of the light emitting elements 81 is not limited thereto. For example, the light source unit 8 may be provided with two or six light emitting elements 81. For example, the light emitting element 81 is provided with a light emitting diode.

The incident surface 710 of the incident lens 71a is convexly curved toward the detection line 6 (shown in FIGS. 4A, 4B) in the direction along the optical axis C. The connecting portion 833 of the supporting member 83 is convexly curved to a detection line 6 side at a curvature with respect to a curvature of the incident surface 710 of the incident lens 71a.

The supporting member 83 is provided with two columns 831, 832 stood upright relative to the circuit board 100, and the connecting portion 833 connecting both ends of two columns 831, 832 in an extending direction, which are opposite to the circuit board 100. The connecting portion 833 extends in the longitudinal direction of the detection line 6 viewed from the camera 7. The connecting portion 833 convexly curves toward the detection line 6 side from the circuit board 100. An oriented surface to the diffusing plate 82 of the connecting portion 833 is formed as a mounting surface 833a on which the light emitting element 81 is mounted through the flexible substrate 101. In the present embodiment, the connecting portion 833 is formed as a covering portion that partially covers the incident surface of the incident lens 71a, which is arranged at an opening 25a side (shown in FIG. 4A) in the window frame 2 of the incident lens 71a. Meanwhile, the connecting portion 833 of the supporting member 83 covers a region having no effect to capture imaging in the detection line 6 of the camera 7.

A plurality of light emitting elements 81 is arranged along the longitudinal direction on the mounting surface 833a of the connecting portion 833 of the supporting member 83. And the mounting surface 833a of the connecting portion 833 of the supporting member 83 is curved to be convex to the opening 25a side of the window glass 25. Thus, a plurality of light emitting elements 81 can be respectively arranged while closing to the optical axis C of the incident lens 71a compared to e.g., a case that a plurality of light emitting elements 81 is arranged to a direction orthogonal to the longitudinal direction of the detection line 6.

The diffusing plate 82 is formed with a curve so as to be along the connecting portion 833 of the supporting member 83. And the location of the diffusing plate 82 in the direction orthogonal to the circuit board 100 is located at the detection line 6 side with respect to the light emitting element 81. The diffusing plate 82 diffuses and emits the non-visible light (near infrared light) emitted from the light emitting element 81 along the longitudinal direction of the detection line 6 widely. The diffusing plate 82 has a substantial rectangular shape extended along the longitudinal direction (front-rear direction of the vehicle) of the detection line 6 when viewed along the optical axis C. The diffusing plate 82 is held on the circuit board 100 by not shown holder.

As shown in FIG. 7B, the light emitting element 81 and the diffusing plate 82 are arranged at a front (upper extended portion 22c side) of the incident lens 71a, and the connecting portion 833 of the supporting member 83 is partially arranged at a position partially overlapping with the incident lens 71a of the camera 7 when the incident lens 71a is viewed from the opening 25a side in the window frame 25 along the optical axis C (i.e., when the incident lens 71a is viewed from the upper extended portion 22c of the window frame 22 for the window glass along the optical axis C). By this configuration, the distance between the diffusing plate 82 of the light source unit 8 and the optical axis C of the incident lens 71a can be reduced. Therefore, the observation angle θ can be reduced, and increasing brightness received in the image pickup device 72 can be intended. That is, it is possible to reduce a number of arranged light emitting elements 82 necessary to obtain a predetermined brightness.

Meanwhile, although the light emitting element 81 and the diffusing plate 82 are arranged at the front of the incident lens 71a, it is not limited thereto. For example, the light emitting element 81 may not be arranged at the front of the incident lens 71a when only the diffusing plate 82 is arranged at the front of the incident lens 71a.

When the diameter of the incident lens 71a is expressed as D, and the distance between the incident lens 71a and the diffusing plate 82 (the distance between a virtual line P1 that is parallel to the longitudinal direction of the incident lens 71a and passes through the center point O, and a virtual line P2 that is parallel to the virtual line P1 and passes through a midpoint M in the short direction of the diffusing plate 83) is expressed as L, e.g., the distance L is 7.85 mm where the diameter D is 23.5 mm.

As shown in FIG. 8A, the diffusing plate 82 is provided with a tabular base 820, and a plurality of protrusions 821 protruded from an opposite side curved surface 820a to a surface opposite to the light emitting element 81 on the base 820 (a surface facing the detection line 6 side). A plurality of protrusions 821 is extended along the transverse direction of the base 820, and is arranged along the longitudinal direction. As shown in FIG. 8B, the diffusing plate 82 diffuses the non-visible light (near infrared rays) from the light emitting element 81 along the longitudinal direction of the diffusing plate 82 by the plurality of protrusions 821. That is, the diffusing plate 82 is configured to diffuse the light emitted from the light emitting element 81 in the direction along the detection line 6.

Next, a control flow of the OPENING/CLOSING BODY DRIVE DEVICE 1 will be described.

Figure 10:
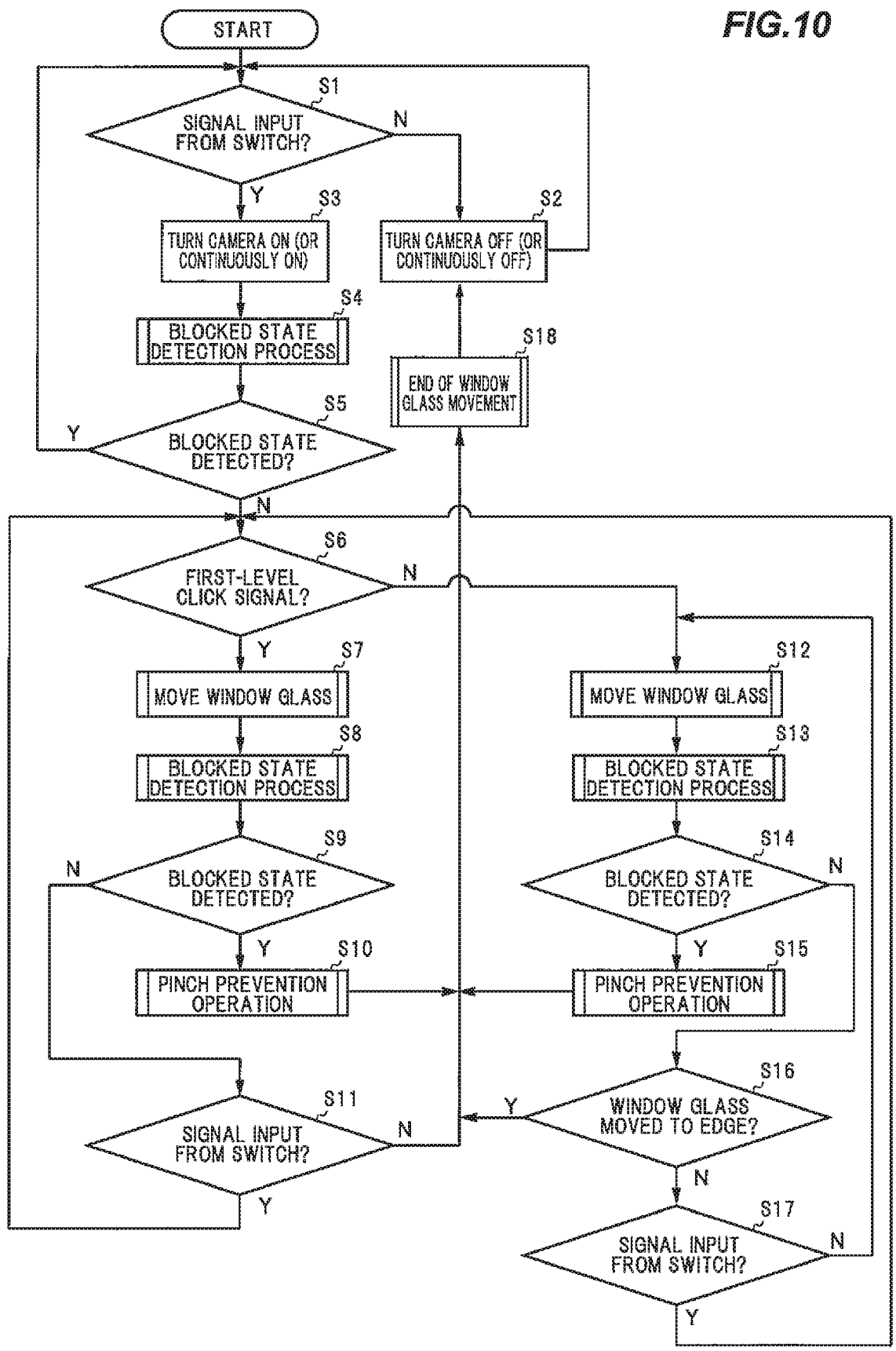
FIG. 10 is a flowchart showing a control flow of the OPENING/CLOSING BODY DRIVE DEVICE.

As shown in FIG. 10, the OPENING/CLOSING BODY DRIVE DEVICE 1 is configured such that the control unit 5 firstly judges whether or not a signal is input from the switch 24 at Step S1. If judged as NO at Step S1, the control unit 5 controls the camera 7 and the light source unit 8 to be turned off (or kept in the off-state) at Step S2 and the flow is allowed to return to Step S1.

If judged as YES at Step S1, the control unit 5 controls the camera 7 and light source unit 8 to be turned on (or kept in the on-state) at Step S3 and the flow is allowed to proceed to Step S4.

At Step S4, the detection unit 51 (i.e., the image processing section 51a and the blocked state determination section 51b) performs a processing of detecting the blocked state (i.e., a blocked state detection processing) based on the image captured by the camera 7. After that, at Step S5, the command cancellation unit 53 judges whether or not the blocked state is detected by the detection unit 51.

If judged as YES at Step S5, the command cancellation unit 53 determines that there is a risk of being pinched by the window glass 3 and the flow is allowed to return to Step S1 without moving the window glass 3 (i.e., the signal from the switch 24 is cancelled).

If judged as NO at Step S5, the control unit 5 judges whether or not the signal input from the switch 24 is a first-level click signal (a first-level move-down click signal or a first-level move-up click signal) at Step S6.

If judged as YES at Step S6, the control unit 5 instructs the drive mechanism 4 to control the movement of the window glass 3 at Step S7.

After that, at Step S8, the detection unit 51 performs a processing of detecting the blocked state (i.e., a blocked state detection processing) based on the image captured by the camera 7. After that, at Step S9, the pinching prevention unit 52 judges whether or not the blocked state is detected by the detection unit 51.

If judged as YES at Step S9, there is a risk of being pinched by the window glass 3. Accordingly, the pinching prevention unit 52 performs a pinch prevention operation such as halting the movement of the window glass 3 or lowering the window glass 3 to the safe position at Step S10. After that, the control unit 5 terminates the movement of the window glass 3 at Step S18 and the flow is allowed to return to Step S2. As describe above, in the present embodiment, if the blocked state is detected while the first-level click signal is being input from the switch 24, the movement of the window glass 3 is terminated after performing the pinch prevention operation.

If judged as NO at Step S9, there is no risk of being pinched by the window glass 3. Accordingly, the control unit 5 judges whether or not a signal is input from the switch 24 at Step S11. If judged as NO at Step S11, this means that an operation on the switch 24 is finished. Accordingly, the control unit 5 terminates the movement of the window glass 3 at Step S18 and the flow is allowed to return to Step S2. If judged as YES at Step S11, the flow is allowed to return to Step S6 and the window glass 3 is kept moving.

On the other hand, if judged as NO at Step S6, i.e., if a second-level click signal (a second-level move-down click signal or a second-level move-up click signal) is input from the switch 24, the control unit 5 instructs the drive mechanism 4 to control the movement of the window glass 3 at Step S12.

After that, at Step S13, the detection unit 51 performs a processing of detecting the blocked state (i.e., a blocked state detection processing) based on the image captured by the camera 7. After that, at Step S14, the pinching prevention unit 52 judges whether or not the blocked state is detected by the detection unit 51.

If judged as YES at Step S14, there is a risk of being pinched by the window glass 3. Accordingly, the pinching prevention unit 52 performs a pinch prevention operation at Step S15. After that, the movement of the window glass 3 is terminated at Step S18 and the flow is allowed to return to Step S2. In other words, in the present embodiment, if the second-level click signal is input from the switch 24 and the blocked state is detected during when the window glass 3 is moving, the movement of the window glass 3 is terminated after performing the pinch prevention operation.

If judged as NO at Step S14, there is no risk of being pinched by the window glass 3. Accordingly, the control unit 5 judges whether or not the window glass 3 is moved to an edge (to the top or bottom end) at Step S16. If judge as YES at Step S16, the control unit 5 terminates the movement of the window glass 3 at Step S18 and the flow is allowed to return to Step S2. Meanwhile, the positional information of the window glass 3 may be obtained by using a rotational pulse generated by a Hall IC incorporated in the motor 41, or using current ripple.

If judged as NO at Step S16, it is judged whether or not a new signal is input from the switch 24 (i.e., whether or not a new signal is input after the second-level click signal is input) at Step S17. If judged as YES at Step S17, the flow is allowed to return to Step S6. If judged as NO at Step S17, the flow is allowed to return to Step S12 and the window glass 3 is kept moving. That is, if the second-level click signal is input, the window glass 3 is kept moving until the blocked state is detected, the window glass 3 is moved to an edge, or a new signal is input from the switch 24.

Operation and Effect of the Embodiment

As described above, in the OPENING/CLOSING BODY DRIVE DEVICE 1 according to the present embodiment, the detection line 6 is formed of the microbead type retroreflective material. The light emitting element 81 and diffusing plate 82 are arranged at the front of the incident lens 71*a* when the incident lens 71*a* is viewed from the opening 25*a* side along the optical axis.

With such configuration, it is possible to reduce the distance between the light source unit 8 and the optical axis C of the incident lens 71*a* of the camera 7 without reducing a substantial aperture of the incident lens 71*a*. Thus, an arranging quantity of the light emitting elements 81 can be minimized, or the light source unit 8 can be composed of low cost light emitting elements having low brightness since reducing light intensity can be controlled when light that is radiated from the light source unit 8 and reflected from the detection line 6 formed of the retroreflective material enters into the incident lens 7*a* of the camera 7.

More specifically, e.g., the distance between the light source unit 8 and the optical axis C of the incident lens 71*a* of the camera 7 increases compared to the present embodiment when the diffusing plate 82 is aligned at the position where the diffusing plate 82 fails to be partially overlapped with the incident lens 71 of the camera 7 (it will be referred to as a comparative example). Accordingly, since the observation angle increases in the comparative example, reducing the brightness can be prevented by increasing the arranging quantity of the light emitting elements 81 or using the high brightness element as the light emitting element 81. Meanwhile, manufacturing cost increases. However, according to the present embodiment, the observation angle can be reduced by reducing the distance between the light source unit 8 and the optical axis C of the incident lens 71*a* of the camera 7. As a result, the arranging quantity of the light emitting elements to fulfill a predetermined brightness value can be minimized Thus, increasing cost according to the light emitting element 81 described above can be controlled. That is, manufacturing cost can be reduced. Furthermore, the camera 7 can detect non-visible light having enough light intensity while cost reduced by using relatively inexpensive microbead type retroreflective material for the detection line 6. As a result, it is possible to realize the OPENING/CLOSING BODY DRIVE DEVICE 1 capable of surely detecting a foreign object that may be pinched while controlling the cost.

Although the embodiments of the invention have been described, the invention according to claims is not to be limited to the above-mentioned embodiment. It should be noted that all combinations of the features described in the embodiments are not necessary to solve the problem of the invention. Further, the invention can be appropriately modified and implemented without departing from the gist thereof.

For example, although not mentioned in the above embodiment, the OPENING/CLOSING BODY DRIVE DEVICE 1 may be provided with a safety device to perform various safety actions such as determining that pinching the foreign object is carried out by the window glass 3, and reversing moving direction of the window glass 3 and automatically lowering when load increases in lifting the window glass 3 and rotation speed of the motor 41 decreases while monitoring the rotation speed of the motor 41.

Further, in the above-described embodiment, although the case to which the door 2 on the rear side of the vehicle is applied has been described, the present invention is not limited thereto. The present invention is also applicable to the door on the front side of the vehicle.

Further, in the above-described embodiment, although the case to which the door 2 having the window glass frame portion 22 is applied has been described, the present invention is applicable to a hardtop door having no window glass frame portion 22 to a door 2 side.

Furthermore, the OPENING/CLOSING BODY DRIVE DEVICE 1 of the present invention is not limited to the vehicle window glass raising/lowering device which automatically raises and lowers the window glass 3 of the door 2 of the vehicle. It is applicable to various devices that moves an opening/closing body between the opening position and the closing position relative to a frame portion having an opening.

Furthermore, in the above-described embodiment, although the light emitting element 81 of the light source unit 8 is supported by the supporting member 83, it is not limited thereto. The supporting member 83 is not an indispensable component. In such case, it should be configured to mount the light emitting element 81 on the circuit board 100 and arrange a light guide member to guide the light emitted from the light emitting element 81 between the light emitting element 81 and the diffusing plate 82.

Furthermore, in the above-described embodiment, since an imaging target of the camera 7 is the detection line 6 provided along the window frame of the vehicle and the vicinity along the detection line 6, e.g., the range of the imaging target of the camera 7 is small compared to a system such as a conventional ingress monitoring system of which the imaging target of the camera 7 is wide. Thus, as with the camera unit 110 according to the present embodiment, it is preferable to have a configuration for arranging the diffusing plate 82 at an overlapped position with the incident lens 71a when viewed from the opening 25a.

Furthermore, in the above-described embodiment, as shown in FIG. 4A, although the light source unit 8 is arranged at the vehicle exterior side with respect to the camera 7, the arrangement position is not limited thereto. The light source unit 8 may be arranged at the vehicle interior side with respect to the camera 7.

Furthermore, in the above-described embodiment, although the connecting portion 833 of the supporting member 83 has a shape extended to the longitudinal direction of the detection line 6 viewed from the camera 7, it is not limited thereto. The connecting portion 833 may have a shape extended to the transverse direction. The supporting member 83 may be composed of a plurality of supporting members.

Furthermore, in the above-described embodiment, although a plurality of light emitting elements 81 is arranged along the longitudinal direction of the connecting portion 833 of the supporting member 83, the alignment direction of a plurality of light emitting elements 81 is not limited thereto. For example, a plurality of light emitting elements 81 may be arranged at an overlapped position with the incident lens 71a when viewed along the optical axis C, and along the direction orthogonal to the longitudinal direction of the detection line 6 viewed from the camera 7. That is, the four light emitting elements 81 may be arranged in a lattice shape so as to form a square by each other.

Figure 11:
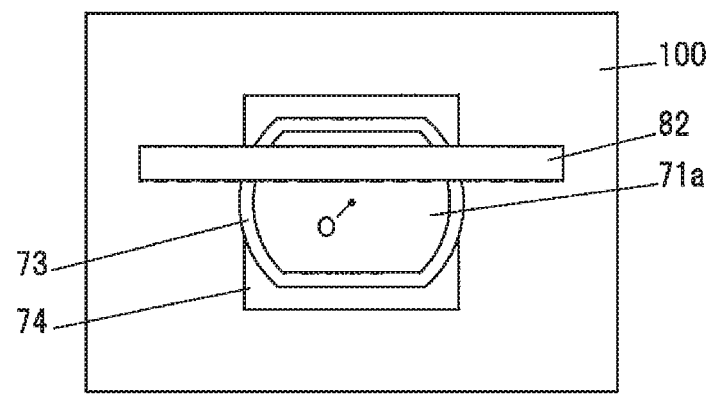
FIG. 11 is a top view illustrating a configuration example of the camera according to the variation.

Furthermore, in the above-described embodiment, as shown in FIG. 7A, although the incident lens 71a of the camera 6 has a circular shape when viewed along the optical axis C, it is not limited thereto. For example, a circular ends of the incident lens 71a may be cut out. More specifically, as shown in the comparative example shown in FIG. 11, the incident lens 71a may have a non-circular shape in which the both ends in the direction orthogonal to the longitudinal direction of the detection line 6 viewed from the camera 7 are cut out. In such case, the diffusing plate 82 of the light source unit 8 is arranged at the front of the incident lens 71a when the incident lens 71a is viewed along the optical axis C. Thus, the same effects as those of the present embodiment can be obtained. Furthermore, since the end of the incident lens 71a is cut out, a size of the incident lens 71a in the direction orthogonal to the longitudinal direction of the detection line 6 can be downsized. Therefore, since a space necessary to arrange the camera 7 is reduced, a layout performance can be increased.

REFERENCE SIGNS LIST

1 OPENING/CLOSING BODY DRIVE DEVICE
3 WINDOW GLASS (OPENING/CLOSING BODY)
4 DRIVE MECHANISM
5 CONTROL UNIT
51 DETECTION UNIT (DETECTION MEANS)
52 PINCHING PREVENTION UNIT (PINCHING PREVENTION MEANS)
6 DETECTION LINE
7 CAMERA
71a to 71d LENS
8 LIGHT SOURCE UNIT
81 LIGHT EMITTING ELEMENT
82 DIFFUSING PLATE
83 SUPPORTING MEMBER
25 WINDOW FRAME (FRAME PORTION)

The invention claimed is:
1. An opening/closing body drive device, comprising:
a drive mechanism that moves an opening/closing body between an opening position and a closing position relative to a frame portion having an opening;
a control unit for controlling the drive mechanism;
a light source unit comprising a light emitting element emitting a non-visible light and radiating the non-visible light to a detection line formed of a retroreflective material along at least a part of the frame portion; and
a camera comprising an incident lens into which the non-visible light radiated from the light source unit and reflected by the detection line enters,
wherein the control unit comprises a detection means for detecting a blocked state in which at least a part of the detection line imaged by the camera is blocked by a foreign object, and a pinching prevention means that forces the drive mechanism to perform a pinch prevention operation for preventing pinching by the opening/closing body when the blocked state is detected by the detection means while the opening/closing body is moved by the drive mechanism, wherein at least of a part of the light source unit is arranged in front of the incident lens when the incident lens is viewed along an optical axis thereof from a side of the opening.

2. The opening/closing body drive device according to claim 1, wherein the light source unit comprises a light diffusing member to diffuse the light emitted from the light emitting element in a direction along the detection line, and wherein the light diffusing member is arranged in front of the incident lens.

3. The opening/closing body drive device according to claim 2, further comprising a supporting member comprising a covering portion that is arranged on a side of an opening of the incident lens and that covers a part of an incident surface of the incident lens, wherein the light emitting element is supported by the covering portion of the supporting member.

4. A vehicle door comprising the opening/closing body drive device according to claim 2, wherein the opening/closing body is a window glass installed in a door of a vehicle, wherein the frame portion is a window frame contacting an outer edge of the window glass in a fully closed state, and wherein the drive mechanism is arranged in the door of the vehicle and moves the window glass in a vertical direction.

5. The opening/closing body drive device according to claim 1, further comprising a supporting member comprising a covering portion that is arranged on a side of an opening of the incident lens and that covers a part of an incident surface of the incident lens, wherein the light emitting element is supported by the covering portion of the supporting member.

6. The opening/closing body drive device according to claim 5, wherein the covering portion extends in a longitudinal direction of the detection line viewed from the camera, and wherein a plurality of light emitting elements are arranged along the longitudinal direction on the side of the opening of the covering portion.

7. A vehicle door comprising the opening/closing body drive device according to claim 6, wherein the opening/closing body is a window glass installed in a door of a vehicle, wherein the frame portion is a window frame contacting an outer edge of the window glass in a fully closed state, and wherein the drive mechanism is arranged in the door of the vehicle and moves the window glass in a vertical direction.

8. A vehicle door comprising the opening/closing body drive device according to claim 5, wherein the opening/closing body is a window glass installed in a door of a vehicle, wherein the frame portion is a window frame contacting an outer edge of the window glass in a fully closed state, and wherein the drive mechanism is arranged in the door of the vehicle and moves the window glass in a vertical direction.

9. A vehicle door comprising the opening/closing body drive device according to claim 1, wherein the opening/closing body is a window glass installed in a door of a vehicle, wherein the frame portion is a window frame contacting an outer edge of the window glass in a fully closed state, and wherein the drive mechanism is arranged in the door of the vehicle and moves the window glass in a vertical direction.

10. A vehicle comprising the vehicle door according to claim 9.

* * * * *